Feb. 23, 1965   W. F. LYGO   3,170,356
CANVAS PARING MACHINES
Filed Jan. 7, 1963   3 Sheets-Sheet 2

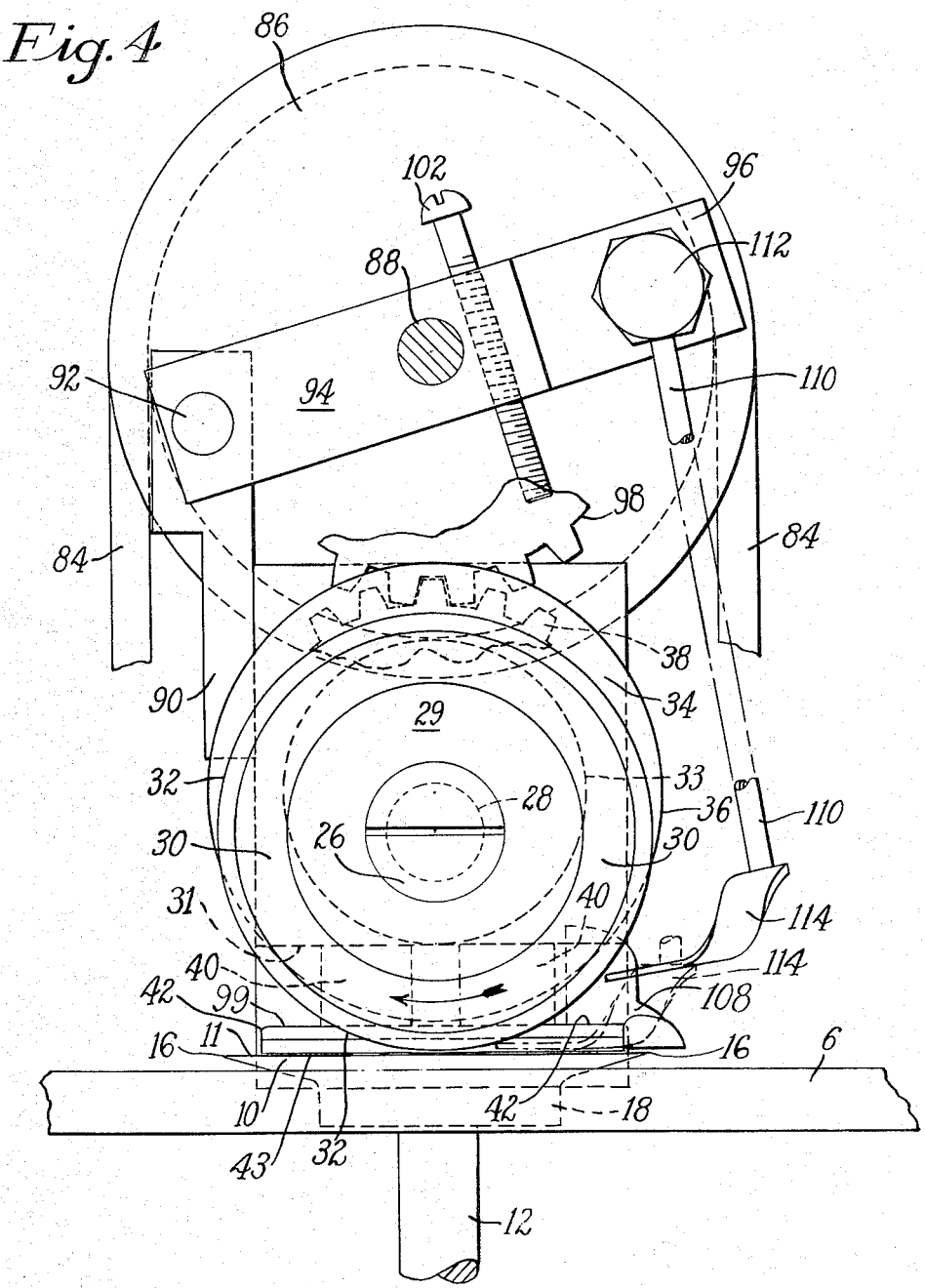

United States Patent Office 3,170,356
Patented Feb. 23, 1965

3,170,356
CANVAS PARING MACHINES
Walter F. Lygo, Leicester, England, assignor to United Shoe Machinery Corporation, Flemington, N.J., a corporation of New Jersey
Filed Jan. 7, 1963, Ser. No. 249,838
Claims priority, application Great Britain, Jan. 10, 1962, 929/62
10 Claims. (Cl. 83—430)

This invention relates generally to garment making and more particularly to trimming machines used in the manufacture of clothing and the like. The machines are designed to trim a marginal strip from one layer of composite sheet material comprising two or more layers.

In the manufacture of tailored garments, stiffening material, usually canvas, is often tacked, stitched or otherwise secured to cut out pieces of cloth. Before the cloth is made up into a garment the canvas backing must be trimmed away a uniform distance inwardly from the edge of the cloth. The trimming operation comprises severing both a margin of the surplus canvas backing material and the tacking thread which secures the canvas backing to the cloth. The process is usually carried out by hand with scissors which is time consuming and consequently an expensive operation. In the apparel art this trimming operation is referred to as "canvas paring."

It is one of the objects of the invention to provide a trimming machine intended to perform completely the function of canvas paring.

Another object of this invention is to provide a canvas paring machine which is easy to operate and requires little training on the part of an operator.

Another of the objects of this invention is to provide a trimming machine which will separate layers of composite material, trimming one of the layers along a predetermined margin.

It is still another object of this invention to provide a relatively inexpensive, easily operated machine which will trim to a uniform margin the surplus material of one of a pair of superposed flexible layers of sheet material.

Another object of this invention is to provide a canvas paring machine which is inexpensive to manufacture and is reliable in operation.

In accordance with these objects and as a feature of the invention there is provided a machine for trimming a marginal portion of one layer of flexible sheet material from a composite sheet of two or more layers stitched together, the machine comprising a work supporting table mounting a first disk knife having a circular cutting edge rotatable in a plane substantially parallel with and slightly above the work table for cutting the stitches which hold the two layers of the work piece together. A second disk knife, also having a circular cutting edge, is mounted in the machine for rotation in a plane which is substantially normal to the first knife. The second knife makes a cut in the upper layer of the material, i.e. the canvas, severing a narrow band from its margin. A guard member is provided which extends over the first disk knife. The guard member may be provided with a shearing face which cooperates with the edge of the second knife for making the marginal cut. The work piece is fed by a feed wheel which engages the upper layer and urges it against the upper surface of the guard. The feed wheel is mounted for movement toward and from the guard independently of the rotation of the knives and its speed of rotation is likewise controlled independently of the speed of the knives. Auxiliary guard members are provided adjacent the main guard member and one of said auxiliary members also functions to urge the work piece into engagement with the edge of the horizontal or stitch severing knife.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

Figure 1:
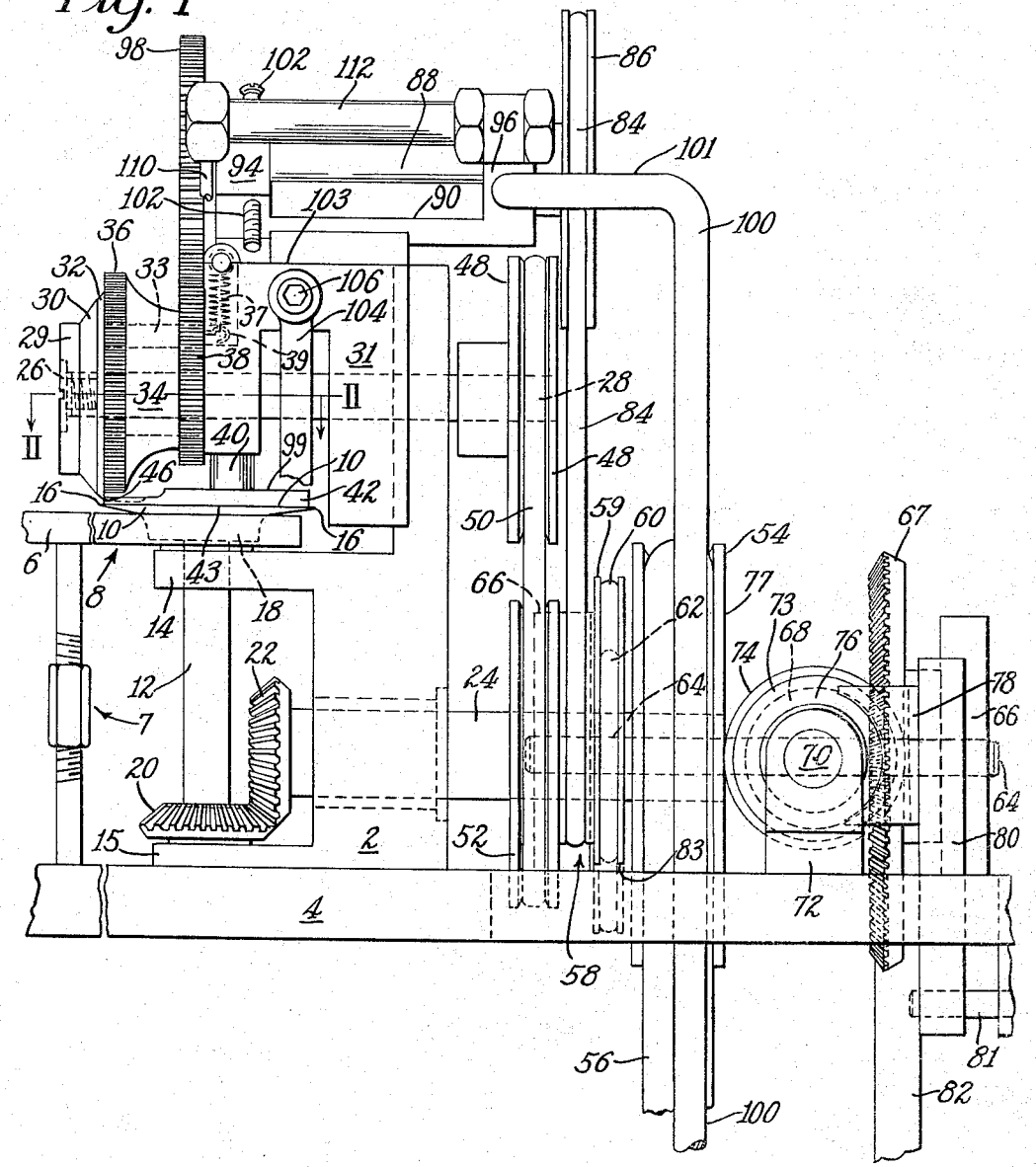
FIG. 1 is a side elevation of an illustrative machine embodying the invention.

The illustrative machine includes a main frame 2 mounted on a base 4 which may be supported on a work bench or table or may be provided with its own legs. A generally horizontal work table 6 is adjustably supported on the base 4 by means designated 7 partially visible in FIG. 1. Formed in the table 6 is an aperture or hollowed-out portion 8, best seen in FIG. 2. A first disk knife 10 is secured to a shaft 12 mounted for rotation about a substantially vertical axis in lugs or bosses 14, 15 extending from the main frame 2. The knife 10 has a circular sharpened knife edge 16 and a boss 18 below the edge. The boss 18 lies within the aperture 8 and the knife edge 16 lies in a plane parallel to and slightly above the upper surface of the work table 6. A bevel gear 20 secured to the lower end of the shaft 12 engages a mating gear 22 fixed to the end of a horizontal shaft 24 which is mounted for rotation in a lower portion of the frame 2.

Another horizontal shaft 28 is mounted for rotation in an upper portion of the machine frame 2. Fixed to the left-hand end (as seen in FIG. 1) of the shaft 28 by a screw 26 and a plate 29 is a second disk knife 30. The knife has a sharpened circular edge 32 which rotates in a plane substantially perpendicular to that of the first described disk knife 10.

Loosely mounted on the shaft 28 between the knife 30 and a block 31 on the frame 2 is a bushing 33. The bushing is capable of restricted up and down movement between the knife 30, which rotates about a fixed axis, and the block 31 which is also fixed. Journaled on the bushing 33 is a feed wheel 34 having a peripheral knurled feeding surface 36 and a gear cut surface 38 on its opposite ends. The bushing 33 about which the feed wheel 34 is free to rotate is urged upwardly relatively to the work table 6 by a spring 37 (FIG. 1) which is stretched between the frame 2 and a hook 39 threaded in the right-hand end of the bushing.

Extending downwardly from the block 31 of the frame 2 is a pair of columns 40. Secured to the lower end of the columns is a guard member 42 which has a flat lower surface 43 (FIG. 4) which lies over and close to the flat upper surface 11 of the knife 10. The guard member 42 covers most of the upper surface of the knife 10 and includes curved edge portions 44 (FIG. 2) which extend slightly inwardly of the edge 16 of the knife 10. The guard member 42 also includes a flat vertical shearing edge 46 which extends between the curved edge portions 44. The knife edge 32 of the knife 30 is engageable with the shearing edge 46. However, the knives 10 and 30 do not touch as seen in FIG. 4.

A pulley 48 is secured to the right-hand end of the shaft 28 and is driven by a belt 50 which passes around a driving pulley 52 secured to the above-mentioned lower horizontal shaft 24, all as seen in FIG. 1. A pulley 54 is secured to the right-hand end of the shaft 24 and is driven by a belt 56 from a motor (not shown) which is the prime power source to the machine. A double pulley 58 is freely mounted on the shaft 24 between the pulleys 52 and 54. The input half 59 of the pulley 58 is driven by a belt 60 which extends from a pulley 62 secured to a shaft 64 which parallels the shaft 24 and lies behind it as viewed in FIG. 1. The shaft 64 is journaled in a pair of bearing arms 66 extending upwardly from the base 4. Also secured to the shaft 64 is a bevel gear 67 meshing with a bevel gear 68 mounted on a transverse horizontal shaft 70 which is perpendicular to the shafts 24 and 64. The shaft 70 is journaled in bosses 72 only one of which is seen extending upwardly from the base 4. A wheel 73 having a rubber tire 74 comprising its periphery is splined onto the shaft 70 and engages the outer (right hand) face surface 77 of the pulley 54. The wheel 73 is movable axially on the shaft 70 along its spline. The wheel 73 includes a boss 76 which is engaged by a yoke 78 mounted on an arm 80 which is pivoted on a stud 81 fixed in a lower portion of the base 4. Extending downwardly from the arm 80 is an arm extension 82 which is connected to a treadle (not shown). Movement of the treadle is transmitted by way of the extension 82 and the arm 80 and the yoke 78 to cause the wheel 73 to move lengthwise of the shaft 70 with its rubber periphery 74 moving across the face 77 of the pulley 54 thereby to drive the shaft 70 from the pulley 74 at varying speeds.

Extending upwardly from the output side 83 of the double pulley 58 is a belt 84 which passes around a pulley 86 secured to a horizontal shaft 88 mounted in a frame member 90 which is pivoted on a stud 92 (FIG. 4) to an upwardly extending portion of the main frame 2. The frame member 90 is generally U-shaped and comprises an arm 94 and an arm 96 which is somewhat longer than the arm 94. The shaft 88 passes through both the arms 94 and 96 as seen in FIG. 4. A gear 98 is secured to the left-hand end of the shaft 88, as seen in FIG. 1, and meshes with the gear cut periphery 38 of the feed wheel 34.

An upwardly biased rod 100, the lower end of which is connected to a second treadle (not shown), has an upper leg 101 which bears against an end portion of the arm 96 and when the machine is inoperative holds the frame 90 upwardly against the force of the tension in the belt 84, the mechanism occupying the positions shown in FIGS. 1 and 4. When in the operation of the machine, the rod 100 is moved downwardly by the second treadle, the frame 90 likewise moves downwardly whereupon the gear 98 and the feed wheel 34 descend. The frame 90 and feed wheel 34 move by gravity and the tension of the belt 84 against the force of the tension spring 37. The feed wheel 34 is then in position to engage the upper layer of material urging it against the upper face 99 of the guard 42 to feed the work past the disk knives 10 and 30. A stop screw 102 in the arm 94 of the frame member 90 limits downward movement of the frame 90 by engagement with an upper portion 103 of the main frame 2.

Figure 2:
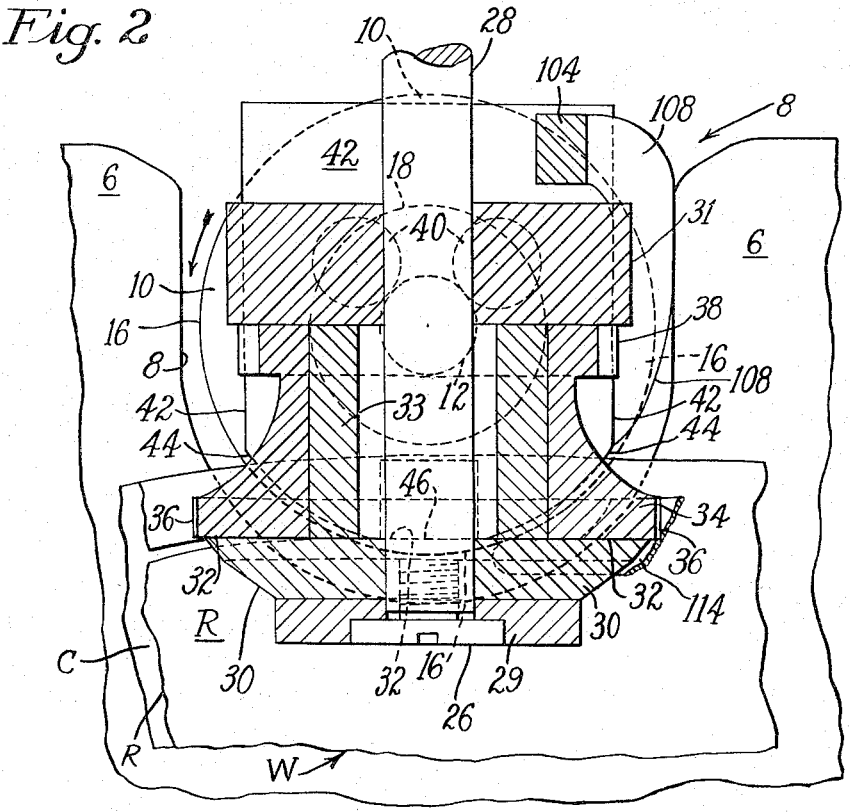
FIG. 2 is a sectional plan view taken along the line II—II of FIG. 1 on an enlarged scale.

The machine includes two additional guards the purposes of which are to reduce the risk of an operator engaging the knives and also to assist in feeding work to the knives. The first additional guard includes a downwardly extending stem 104 (FIG. 1) the upper end of which is secured by a screw 106 to the main frame. At the lower end of the stem 104 is an arcuate foot 108, seen in FIGS. 2 and 4, which abuts the above-described guard member 42 at its right hand or work input side and extends over the right-hand edge of the knife 10, as seen in FIGS. 2 and 4.

Figure 3:
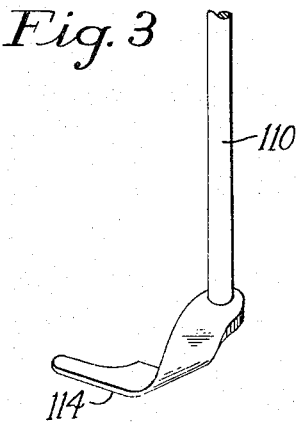
FIG. 3 is a perspective view of a guard and work presser member used on the machine; and, FIG. 4 is an enlarged front elevation of the illustrative machine with parts removed and as it appears to an operator.

The other additional guard, also serving as a work presser member, comprises a downwardly extending stem 110 which depends from the left-hand end of a bar 112 fixed to the arm 96 of the frame 90. The stem 110 mounts at its lower end a foot 114, which is best seen in FIG. 3, which, when the frame is moved downwardly, moves from the solid line to the broken line position in FIG. 4 over the edge of the knife 10 and engages the upper layer of work being fed to the knives pressing it downwardly against the edge of the knife 10.

The machine operates in the following manner. The pulley 54 is driven by the main motor (not shown) and through the above-described mechanism causes the knives 10 and 30 to be rotated in the directions shown in FIGS. 2 and 4, respectively. In the inoperative position, the rubber surface 74 of the wheel 73 is located at the center of the pulley 54 and thus rotation of the pulley 54 does not impart driving motion to the feed wheel 34 through the above-described mechanism including the gears 38 and 98 and the pulleys 86 and 58, etc. While the machine is in the inoperative condition but with the knives rotating, the operator presents to the machine a composite work piece W (FIG. 2) comprising a lower layer of cloth C and an upper layer of canvas R stitched or otherwise tacked to it. He positions the work piece W so that the cloth layer C lies on the table 6 with an edge portion passing under the horizontal knife 10 the upper surface of which, as explained above, is higher than the upper surface of the table 6. A corner of the mating edge of the upper layer R is separated from the cloth layer C below it and passed over the horizontal disk knife 10 and the guard member 42. The operator then treadles the machine, which through the first-mentioned treadle, the arm extension 82 and arm 80 urges the wheel 74 radially outwardly of the pulley 54 while its rubber surface 74 remains in contact with the surface 77. Thus, through the wheel 73 and the above-described power train, the feed wheel 34 is caused to rotate.

Treadling the second treadle of the machine, through the action of the lever 100, the frame member 90 is allowed to descend permitting the feed wheel 34, which is now rotating, to contact the upper surface of the upper layer, i.e. the canvas R, and feed the composite work piece W past the knives 10 and 30. Simultaneously the foot 114 descends from the solid to the broken line position as seen in FIG. 4 on top of the canvas layer R urging it against the top surface of the horizontal knife 10.

The knife 30 cooperates with the shearing surface 46 on the guard member 42 to sever a marginal strip of canvas backing material (the layer R). The cut made by the knife 30 is made at the desired distance inwardly of the edge of the combined layers. The knife 10 simultaneously severs any stitching or tacking which holds the unsevered layers of cloth C to the trimmed marginal portion of the backing material R which is severed by the knife 30. The speed of feed of the work piece past the knives 10 and 30 is determined by the operator controlling the position of the rubber surface 74 of the wheel 73 on the face 77 of the pulley 54. The nearer the wheel 73 is to the periphery of the pulley 54 the faster the feed wheel 34 rotates. The position of the wheel 73 is controlled by how much the operator depresses the first-mentioned treadle, i.e. that attached to the rod extension 82.

As the work piece W is fed past the knives to sever the marginal portion of the layer R of canvas backing material, the canvas rides upwardly over the right-hand edge of the guard 42 if the work piece has a straight or convex edge and if the edge is sharply concave the work piece may also ride upwardly over the guard 108 which forms a continuation of the guard 42.

Having thus described my invention, what I claim as new and desire to secure by Letters Patent of the United States is:

1. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second knife having a circular cutting edge rotatable in a plane substantially normal to the edge of the first knife for cutting a marginal strip from one of said layers, a guard member extending over the first disk knife, and a feed wheel rotatable adjacent said second knife and above said guard member to urge said one layer against the guard member to feed the composite sheet material past the knives.

2. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife for cutting a marginal strip from one of said layers, a guard member extending over the first disk knife, a feed wheel rotatable adjacent said second knife and above said guard member to urge said one layer against the guard member to feed the composite sheet material past the knives, and means for moving said feed wheel toward and away from said guard member independently of said knives.

3. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife fixed to a driving shaft and having a circular cutting edge rotatable in a plane substantially normal to the edge of the first knife for cutting a marginal strip from one of said layers, a feed wheel rotatable above said work table, and means mounting said feed wheel loosely on the driving shaft of the second knife for movement toward and away from the work table.

4. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife for cutting a marginal strip from one of said layers, a guard member extending over the first disk knife, means for feeding a work piece past said knives with said one layer in engagement with the guard member, and a second guard member positioned adjacent said first guard member on the side first engaged by said one layer of composite sheet material being fed.

5. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife for cutting a marginal strip from one of said layers, a feed wheel forcibly engageable with the work piece for feeding it past said knives, and a presser member engageable with said one layer of composite sheet material to urge it against the edge of the first disk knife.

6. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife, a guard member extending over the first disk knife, and a shearing face on the guard member engageable with the edge of said second knife for cutting a marginal strip from one of said layers.

7. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife for cutting a marginal strip from one of said layers, a guard member extending over the first disk knife, a feed wheel rotatable adjacent said second knife and engageable with said one layer of composite sheet material above said guard member, a presser member engageable with the said one layer above the edge of the first disk knife, and means for simultaneously moving the feed wheel and the presser member downwardly into engagement with the said one layer moving it into engagement with said guard member and said first disk knife respectively.

8. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife for cutting a marginal strip from one of said layers, a guard member extending over the first disk knife, a feed wheel rotatable adjacent said second knife above said guard member to urge said one layer against the guard member to feed the composite sheet material past the knives, and variable speed pulley means for controlling the speed of rotation of the feed wheel independently of the speed of rotation of said knives.

9. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife having a circular cutting edge rotatable in a plane substantially normal to the edge of the first knife for cutting a marginal strip from one of said layers, a guard member extending over the first disk knife, a feed wheel rotatable adjacent said second knife above said guard member to urge said one layer against the guard member to feed the composite sheet material past the knives, a presser member engageable with the said one layer above the edge of the first disk knife, means for simultaneously moving the feed wheel and the presser member downwardly into engagement with the said one layer moving it into engagement with said guard member and said first disk knife respectively, and variable speed pulley means for controlling the speed of rotation of the feed wheel independently of the speed of rotation of said knives.

10. A machine for trimming a marginal portion of one layer of sheet material from a composite sheet of two or more layers stitched together comprising, a work table, a first disk knife having a circular cutting edge rotatable in a plane substantially parallel with and above the work table for cutting the stitches holding two of said layers together, a second disk knife fixed to a driving shaft and having a circular cutting edge rotatable in a plane substantially normal to the edge of the first knife, a guard member extending over the first disk knife, a shearing face on the guard member engageable with the edge of said second knife for cutting a marginal strip from one of said layers, a feed wheel rotatable adjacent said second knife above said guard member, means mounting said feed wheel loosely on the driving shaft on the second knife, a second guard member positioned adjacent said first guard member on the side first engaged by said one layer of composite sheet material, a presser member engageable with said one layer of composite sheet material above the edge of the first knife, means for simultaneously moving the feed wheel and the presser member downwardly into engagement with said one layer moving it into engagement with said guard member and said first disk knife respectively, and variable speed pulley means for controlling the speed of rotation of the feed wheel independently of the speed of rotation of said knives.

References Cited in the file of this patent
UNITED STATES PATENTS

| | | |
|---|---|---|
| 740,730 | Zeh | Oct. 6, 1903 |
| 923,426 | Gisriel | June 1, 1909 |
| 1,094,821 | Schoenfeld | Apr. 28, 1914 |
| 1,361,531 | Morris | Dec. 7, 1920 |
| 1,626,093 | Neasham | Apr. 26, 1927 |
| 1,813,598 | Ackley | July 7, 1931 |
| 1,825,223 | Deck | Sept. 29, 1931 |
| 3,063,321 | Nicolay | Nov. 13, 1962 |